United States Patent [19]

Nurse, Jr.

[11] Patent Number: 5,683,577
[45] Date of Patent: Nov. 4, 1997

[54] FILTER DEVICE FOR WASTEWATER TREATMENT SYSTEM

[76] Inventor: Harry L. Nurse, Jr., 10409 Watterson Trail, Louisville, Ky. 40299

[21] Appl. No.: 651,737

[22] Filed: May 22, 1996

[51] Int. Cl.[6] .................. B01D 21/24; B01D 35/027
[52] U.S. Cl. .................. 210/170; 210/308; 210/435; 210/450; 210/459; 210/532.2
[58] Field of Search .................. 210/170, 299, 210/305, 308, 435, 437, 450, 452, 459, 460, 495, 532.2, 311, 256

[56] References Cited

U.S. PATENT DOCUMENTS

| | | | |
|---|---|---|---|
| 2,900,084 | 8/1959 | Zabel | 210/532.2 |
| 3,332,552 | 7/1967 | Zabel | 210/532.2 |
| 3,970,566 | 7/1976 | Rosaen | 210/452 |
| 4,420,040 | 12/1983 | Arbasak et al. | 210/435 |
| 4,439,323 | 3/1984 | Ball | 210/532.2 |
| 4,710,295 | 12/1987 | Zabel | 210/532.2 |
| 5,207,896 | 5/1993 | Graves | 210/532.2 |
| 5,221,470 | 6/1993 | McKinney | 210/311 |
| 5,382,357 | 1/1995 | Nurse | 210/170 |
| 5,449,453 | 9/1995 | Tang | 210/108 |
| 5,487,828 | 1/1996 | Goet | 210/435 |
| 5,569,387 | 10/1996 | Bowne et al. | 210/532.2 |

*Primary Examiner*—Christopher Upton
*Attorney, Agent, or Firm*—Middleton & Reutlinger; Charles G. Lamb

[57] ABSTRACT

A filter device useful in continuous separation of solid matter from a liquid, such as liquid wastewater, where the filter includes a tubular filter element with a series of slots of selected width extending through the tubular element. The filter element has a longitudinally extending central opening with a fluid inlet therein and is received in a first tubular casing with an annular area defined between the tubular filter element and the first casing so the central opening is open to receive liquid to be filtered, liquid being filtered as the liquid flows outwardly through the slots from the central opening to the annular area. A seal is provided between the tubular element and the inside of the first casing at a location below the slots in the tubular element to prevent unfiltered wastewater from entering the annular area. A second tubular casing is provided which extends downwardly beyond the lower terminating end of the tubular filter element, the second tubular casing including flow-through openings or slots therein for the passage of liquid therethrough. The second tubular casing flow-through openings are in flow communication with a fluid inlet into the central opening of the filter element.

16 Claims, 3 Drawing Sheets

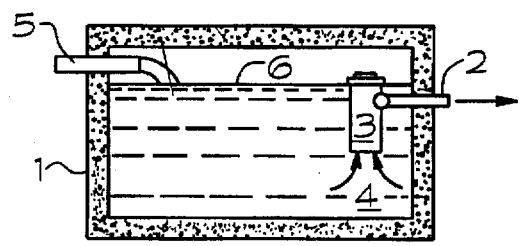
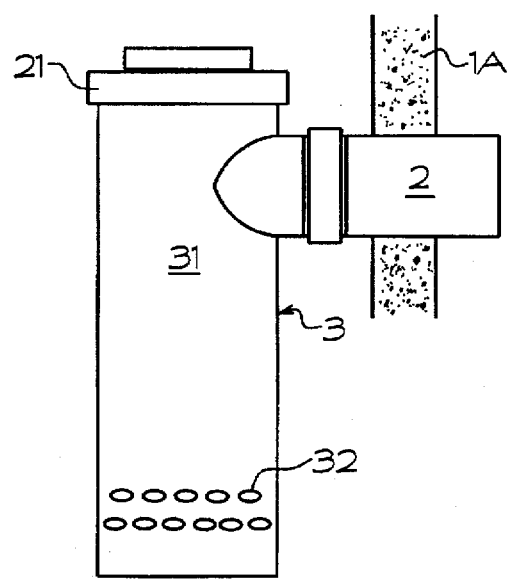
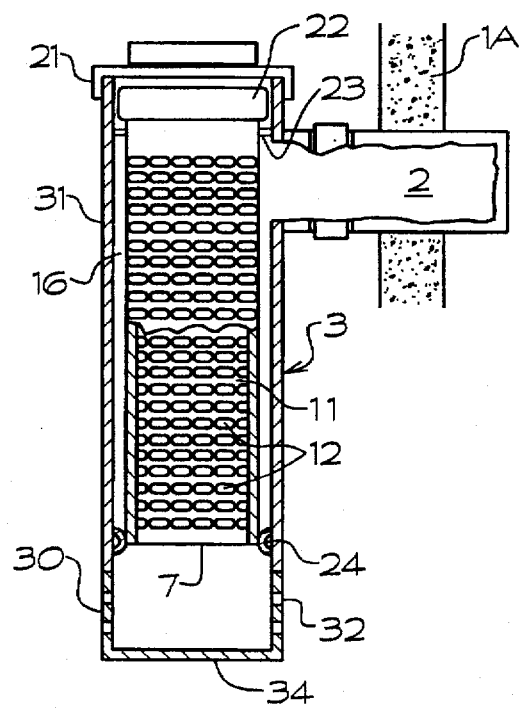

FILTER DEVICE FOR WASTEWATER TREATMENT SYSTEM

BACKGROUND OF THE INVENTION

The present invention relates in general to filter devices and more particularly relates to a new fluid filter device useful in filtering particulate matter from liquids, such as in the effluent from wastewater treatment facilities.

Filters for removing particulate matter from liquids, particularly wastewater from wastewater treatment facilities are well known. Filter devices for such purposes include stacked disc-dam filter elements as taught in U.S. Pat. Nos. 2,900,084 and 3,332,552. These references teach filter elements which have proved highly effective for removal of solid matter from fluids, particularly for treatment of sewage in septic tanks and for removal of other solid matter from liquids in wastewater treatment facilities. Other devices are taught in U.S. Pat. Nos. 4,439,323 and 4,179,372, but none has the effectiveness of devices within the scope of the present invention, particularly as to cost of devices within the scope of the present invention.

Even another prior art device to which the present invention is an improvement thereover is U.S. Pat. No. 5,382,357.

SUMMARY OF THE INVENTION

The present invention relates in general to filter devices for removal of solid material from fluids and more particularly relates to improved slotted filter elements.

One object of the present invention is to provide a filter device to allow streamlined fluid flow and improve overall performance of the filter while significantly reducing the cost of the assembly relative to the cost of other type filters to accomplish the same purposes.

Another object of the present invention is to provide a filter with increased filtering capacity in the same volume of space as other commercially available filters and significantly reduce both assembly cost and material cost.

Even another object within the scope of the present invention provides filters which are self cleaning so that it is not generally necessary to open the filter for cleaning.

Briefly, the present invention provides a filter device useful in continuous separation of solid matter from a liquid where the filter includes a tubular filter element with a series of slots of selected width extending through the walls of the tubular element. The tubular element has a longitudinally extending central opening from a lower end to a top end with a flow-through inlet at its lower end. The tubular filter element is received within a casing with an annular area defined between the exterior of the tubular filter element and the interior of the casing through the central opening. A seal is provided between the exterior of the tubular element and the interior of the casing at a location below the slots in the tubular element. Fluid to be filtered flows upwardly into the interior of the filter element then out through the slots in the tubular element to the annular area. The casing includes an outlet from the annular area so the liquid can be emitted from the assembly.

Arrangements within the scope of the present invention provide further advantages in that the filter element can be easily installed into standard size pipe used in plumbing so the filter element can be retrofitted into existing facilities without substantial modification of the treatment facilities.

Examples of arrangements within the scope of the present invention are illustrated in the accompanying drawings and described hereinafter but it will be understood that neither the drawings nor the descriptions thereof are presented by way of limitation and that other arrangements also within the scope of the present invention will occur to those skilled in the art upon reading the disclosure set forth hereinafter.

BRIEF DESCRIPTION OF THE DRAWINGS

FIG. 1 is a cross-sectional elevational view of an example of a device within the scope of the present invention in a septic tank in a sewage treatment application;

FIG. 2 is an enlarged detailed view of one example of a device within the scope of the present invention;

FIG. 3 is an enlarged detailed view of one preferred embodiment of FIG. 2 in partial cross-section;

DETAILED DESCRIPTION OF THE DRAWINGS

Figure 4:
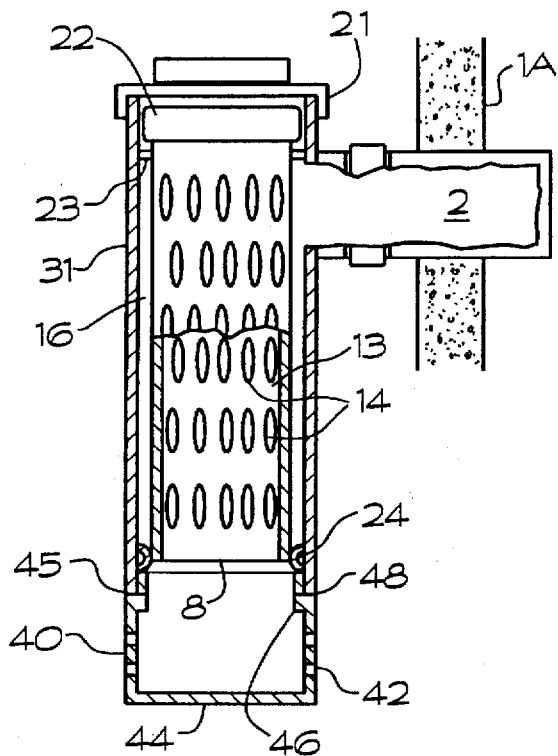
FIG. 4 is an enlarged detailed view of another preferred embodiment of FIG. 2 in partial cross-section.

FIG. 1 is an elevational view of an example of a filter device 3 within the scope of the present invention in a septic tank 1 in a sewage treatment application. The fluid to be filtered is admitted through an inlet 5 into the septic tank 1. A level 6 of a liquid 4 is maintained in the tank 1 and filtered liquid is emitted from the tank 1 by means of an outlet 2.

FIG. 2 is an enlarged view showing the filter element 3 in place with the outlet 2 extending through wall 1A of the tank 1.

Referring now to FIG. 3 which shows one preferred embodiment of a filter device in accordance with the present invention wherein fluid to be treated enters the device 3 through a plurality of openings 32 disposed circumferentially around a second tubular casing 30 which is unitary with and a downward extension of the first tubular casing 31. A filter arrangement is located within the first tubular casing 31 to remove particulates from the liquid 4 as it flows upward through the first tubular casing 31. The filter arrangement includes a tubular element 11 with slots 12 as shown in FIG. 3 or slots 14 of a tubular element 13 as shown in FIG. 4. In FIG. 3 the slots 12 extend circumferentially while in FIG. 4 the slots 14 are disposed vertically. In both cases the width of the slots is advantageously equal to the maximum diameter of the particles which can pass through with the effluent.

It has been found that the slots 12, 14 can be located in virtually any orientation and that the filtration can be successfully accomplished regardless of the orientation of the slots. It has further been found that filter arrangements in accordance with the present invention as shown in the Figures are generally self cleaning because the flow of fluid 4 through the slots 12, 14, tends to sweep the particulate material 64 (FIG. 6A) out of the slots 12, 14, and then fall through the openings 7 of the tubular filter of FIG. 3 or the opening 8 of the tubular filter of FIG. 4.

As shown in FIG. 3, the second tubular casing 30 extends downwardly below the terminating lower end of the filter element 11. The second tubular casing 30 is provided with a plurality of horizontally or circumferentially extending filter openings 32 (FIG. 2) therethrough, openings 32 being of a preselected size to prevent large solid particles from flowing through said openings. In one preferred arrangement the openings 32 are approximately ½" in diameter. The second tubular casing 30 is also provided with a centrally disposed opening 34 which is in coaxial alignment with the opening 7 of the filter element 11.

Figure 7A:
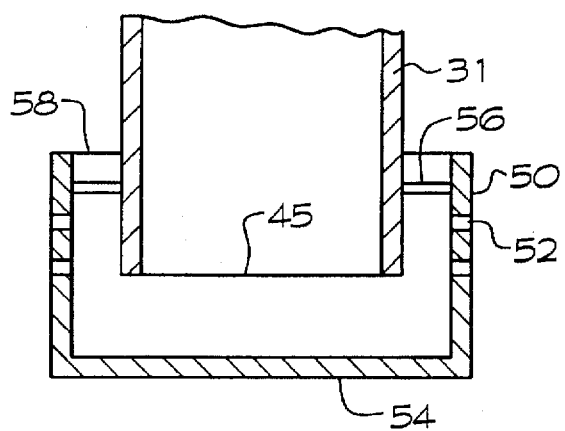
FIG. 7A is an enlarged view of another example in partial cross section of the second tubular casing and its connection to the first tubular casing of the present invention.
Figure 7B:
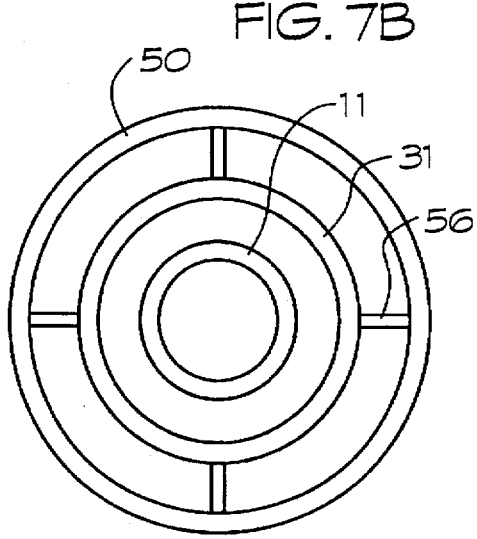
FIG. 7B is a bottom view of FIG. 7A.

In FIG. 4 is shown another arrangement for the second tubular casing of the present invention wherein the second tubular casing is formed of a separate element from the first tubular casing 31. In this particular arrangement the second tubular casing identified by the numeral 40 is provided with a closed end 44 and a plurality of horizontally extending openings of preselected size 42 for the flow of fluids therethrough. The second tubular portion 40 is provided with means to snap into the bottom end opening 45 of the first tubular casing 31. The means for snapping the casing 40 into the casing 31 is an inwardly extending flange portion 46 terminating in an upwardly extending ring portion 48 wherein the outer diameter of the ring portion 48 is substantially the same as the inner diameter of the casing 31. FIGS. 7A and 7B show another embodiment of a second tubular casing and its connection to the first tubular casing 31, the second tubular casing being identified by the numeral 50. Casing 50 is of cylindrical shape and has an inner diameter greater than the outer diameter of the tubular casing 31. Casing 50 is provided with a plurality of horizontally extending flow-through openings 52 therein and a closed bottom 54. A plurality of horizontally extending fingers 56 are provided for attaching the casing 50 in spaced relation with the casing 31 with a flow-through annular area therebetween. Casing 50 may also be provided with a top end opening 58, as shown, or the top end of the casing 50 may be closed off (not shown).

Figure 8:
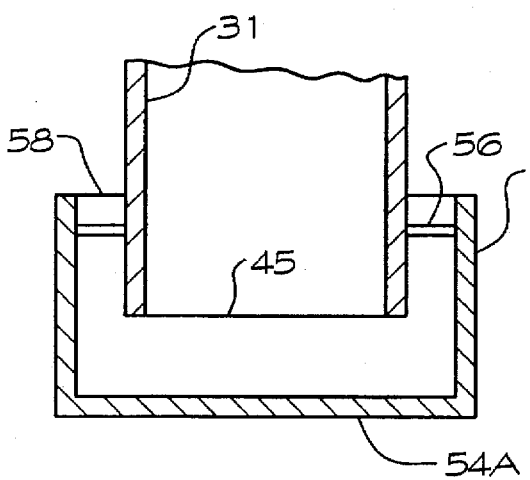
FIG. 8 is an enlarged view of another example in partial cross-section of the second tubular casing and its connection to the first tubular casing of the present invention; and, FIG. 9 is an enlarged view of another example of a lower end of a tubular filter element of the present invention.

FIG. 8 shows a partial cross-sectional view of another embodiment of the present invention showing the connection between a second tubular casing with the first tubular casing 31. In FIG. 8 the casing identified by the numeral 50A is connected to the first tubular casing 31. Casing 50A is also of cylindrical shape and has an inner diameter greater than the outer diameter of the tubular casing 31. Casing 50A is provided with solid sidewalls and a closed off bottom end as identified by the numeral 54A. And, a plurality of horizontally extending fingers 56 are provided for attaching the casing 50A in spaced relation with the casing 31. Casing 50A is provided with a top end opening 58 as the inlet for the fluid into the filter device 3.

Figure 9:
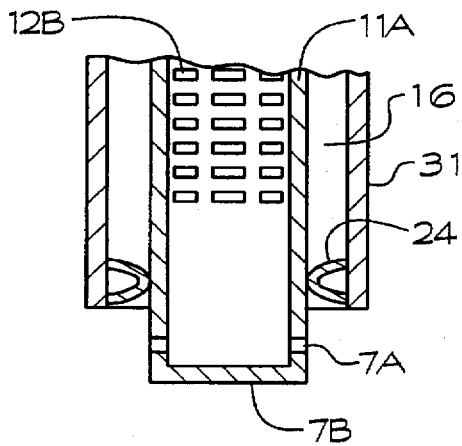

FIG. 9 shows another embodiment of a tubular filter element 11A having a lower end 7B closed off but extending downwardly beyond the lower terminating end of the first tubular casing 31. Flow-through openings 7A are provided in the vertical sidewalls of the filter tubular element vertically downward from the seal 24 which is provided between the inner surface of the first tubular casing 31 and the outer surface of the tubular filter element 11A.

Several procedures can be used to produce the filter elements 11, 11A, 13 within the scope of the present invention. In one case the filter element 11, 11A, 13 can be a plastic tube where the slots 12, 12B, 14 are simply cut into the element. In other cases other procedures can be used. For example, the filter element 11, 11A, 13 can be molded in elongate sections and the sections fastened together along their edges, for example by adhesive. In these cases, and particularly where the filter element is molded in two halves which are assembled to form the tubular element, the internal configuration of the slots 12, 12B, and 14 can be adjusted as shown in FIGS. 6A and 6B to enhance the self cleaning capabilities of the filter.

Figure 6A:
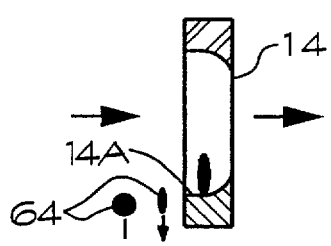
FIG. 6A is an enlarged detailed view in cross-section of a slot of the device of FIG. 4.
Figure 6B:
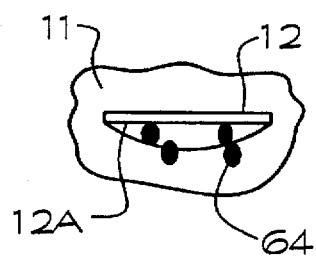
FIG. 6B is an enlarged detailed view in cross-section of a slot of the device of FIG. 3.

FIG. 6A is an illustration of a cross-sectional segment of the wall 13 of the filter arrangement shown in FIG. 4 where the slots 14 extend generally vertically. In FIG. 6A the slots 14 extend through the wall 13 but the edges 14A have been rounded as shown to provide a guide for emission of particulate matter 64 from the slot. The capability to direct the particulate matter from the slot enhances the self cleaning capability of the device. FIG. 6B is an illustration of one example of a slot configuration which can be used with devices of the type shown in FIG. 3 where the slots 12 are generally disposed horizontally. In FIG. 6B, the slot 12 is shown to be formed with a lip 12A which facilitates the flow of the particulate matter 64 from the slot 12.

As shown in the FIGS. the tubular filter element 11, 11A, 13, is received in the first casing 31 to form an annular flow area 16 between the filter element 11, 11A, 13 and the casing 31 which receives the effluent which has passed through the slots 12, 12B, 14 of the filter element. In each case a seal is provided between the filter element and the casing 31 at the top and bottom of the flow area to isolate the effluent from the rest of the system.

Figure 5:
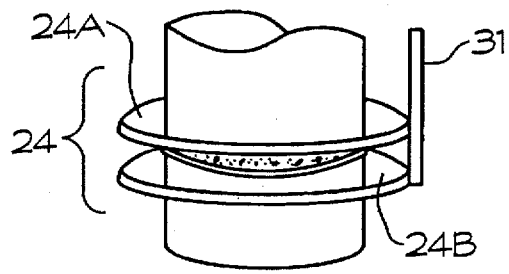
FIG. 5 is an enlarged detailed view of one example of a seal arrangement within the scope of the present invention in partial cross-section.

An example of a bottom seal as shown in FIG. 5 includes a flexible ring 24 which can be attached to the bottom of tubular element 11, 11A, 13 and can be provided with two outwardly extending circumferential rings 24A and 24B which engage the inner surface of the casing 31 to form a seal to prevent bypass of fluid from the tank 1 directly to the outlet 2.

At the upper end, the tubular filter element 11, 11A, 13 may be provided with a cap 22 as shown in FIGS. 1, 3 and 4. A ring seal 23 can be provided around the inner periphery of casing 31 and adapted to seal the tubular filter and to support the tubular filter in the casing 31. An outlet 2 is provided from the filter device 3 for emission of treated fluid.

While examples within the scope of the present invention are shown and discussed with reference to sewage treatment it will be understood that devices within the scope of the present invention can be equally effectively used in other applications, such as, for example, the removal of sand and the like from drainage water as well as other waste water treatment systems.

It will be understood that the foregoing examples are not by way of limitation of the present invention and that other arrangements also within the scope of the present invention will occur to those skilled in the art upon reading the disclosure set forth hereinbefore.

What is claimed is:

1. In combination with a wastewater treatment system, a filter device useful in continuous separation of solid matter from a fluid comprising:

a tubular filter element with a series of slots of preselected width extending through the tubular element, said element having a longitudinally extending central opening extending from a lower end to a top end, said lower end having a flow-through inlet;

a first tubular casing having a longitudinally extending central opening with an inner diameter greater than an outer diameter of said filter element, said first tubular casing receiving said filter element in a coaxial alignment defining an annular area between an outer surface of the tubular filter element and an inner surface of the casing, said first tubular casing having a discharge outlet in flow communication with said annular area;

seal means provided between the outer surface of the tubular element and an inner surface of the first casing at a location below the slots in the tubular element; and a second tubular casing having a sidewall extending downwardly from said tubular filter element and provided with at least one flow-through opening in flow communication with said tubular filter element flow-through inlet and having horizontally disposed flow through openings of preselected size in said sidewall.

2. The filter device of claim 1, said second tubular casing being unitary with said first tubular casing.

3. The filter device of claim 1 wherein said second tubular casing is separate from and attached to said first tubular casing.

4. The filter device of claim 3, said second tubular casing including an inwardly horizontally extending flange section terminating with an upwardly extending ring portion, an outer surface of the ring portion being received within a bottom opening of said first tubular casing, said ring portion having an outer diameter substantially the same as an inner diameter of said first tubular casing.

5. The filter device of claim 3, said second tubular casing having an outer diameter the same as an outer diameter of said first tubular casing and in coaxial alignment with said first tubular casing.

6. The filter device of claim 1, said second tubular casing being co-extensive with said tubular filter element and extending downward beyond a bottom terminating end of said first tubular casing.

7. The filter device of claim 6, said second tubular casing having a closed bottom.

8. The filter device of claim 6, said second tubular casing being unitary with said tubular filter element.

9. A filter device useful in continuous separation of solid matter from a fluid comprising:

a tubular filter element with a series of slots of preselected width extending through the tubular element, said element having a longitudinally extending central opening extending from a lower end to a top end, said lower end having a flow-through inlet;

a first tubular casing having a longitudinally extending central opening with an inner diameter greater than an outer diameter of said filter element, said first tubular casing receiving said filter element in a coaxial alignment defining an annular area between an outer surface of the tubular filter element and an inner surface of the casing, said first tubular casing having a discharge outlet in flow communication with said annular area;

seal means provided between the outer surface of the tubular element and an inner surface of the first tubular casing at a location below the slots in the tubular element; and a second tubular casing having a sidewall extending downwardly from said tubular filter element and provided with at least one flow-through opening in flow communication with said central opening at said lower end of said tubular filter element and having horizontally disposed flow through openings of preselected size in said sidewall.

10. The filter device of claim 9 wherein said second tubular casing is unitary with said tubular casing.

11. The device of claim 9 wherein said second tubular casing is separate from and attached to said tubular casing.

12. The device of claim 11, said second tubular casing including an inwardly horizontally extending flange section terminating with an upwardly extending ring portion, an outer surface of the ring portion being received within a bottom opening of said first tubular casing, said ring portion having an outer diameter substantially the same as an inner diameter of said first tubular casing.

13. The filter device of claim 11, said second tubular casing having an outer diameter the same as an outer diameter of said first tubular casing and in coaxial alignment with said first tubular casing.

14. The filter device of claim 9, said second tubular casing being co-extensive with said tubular filter element and extending downwardly beyond a bottom terminating end of said first tubular casing.

15. The filter device of claim 14, said second tubular casing having a closed bottom.

16. The filter device of claim 14, said second tubular casing being unitary with said tubular filter element.

* * * * *